United States Patent [19]

Erni

[11] Patent Number: 4,944,033
[45] Date of Patent: Jul. 24, 1990

[54] COMMUNICATIONS SYSTEM FOR AN INSTALLATION AND METHOD OF CONTROLLING SUCH INSTALLATION

[75] Inventor: Markus Erni, Winterthur, Switzerland

[73] Assignee: Maschinenfabrik Rieter AG, Winterthur, Switzerland

[21] Appl. No.: 195,857

[22] Filed: May 19, 1988

[30] Foreign Application Priority Data

May 20, 1987 [CH] Switzerland ............ 01933/87

[51] Int. Cl.$^5$ .............. G06K 17/00; G06F 15/46
[52] U.S. Cl. ................. 364/470; 364/468; 364/469; 364/222.2; 364/222; 364/921; 364/919
[58] Field of Search ........... 364/470, 468, 478, 469, 364/200, 900; 235/375

[56] References Cited

U.S. PATENT DOCUMENTS

| | | | |
|---|---|---|---|
| 4,591,991 | 5/1986 | Sticht | 364/478 |
| 4,688,300 | 8/1987 | Langen et al. | 19/159 A |
| 4,821,198 | 4/1989 | Takeuchi et al. | 364/468 |

FOREIGN PATENT DOCUMENTS

| | | |
|---|---|---|
| 0026112 | 1/1981 | European Pat. Off. . |
| 2629101 | 6/1976 | Fed. Rep. of Germany . |
| 1258342 | 12/1971 | United Kingdom . |
| 1258343 | 12/1971 | United Kingdom . |
| 1258344 | 12/1971 | United Kingdom . |

OTHER PUBLICATIONS

English translation of "Use of Sensors in Automated Production Systems", M. Weck et al., Technische Rundschau, No. 77, (1985), pp. 180-183 and 186.
Article entitled "Der Einsatz von Sensoren in Automatisierten Fertigungssystemen", Von Manfred Weck and Hans-Georg Lauffs, No. 37, Sep. 1985, pp. 180 through 183 and 186.

Primary Examiner—Jerry Smith
Assistant Examiner—Paul Gordon
Attorney, Agent, or Firm—Werner W. Kleeman

[57] ABSTRACT

An installation comprises two rows of closely adjacent material processing stations and a data-processing system to monitor and/or control the material-processing stations. The installation also has a travelling unit or tender to service the material-processing stations. The tender has a send-receive unit and each material-processing station has a corresponding send-receive unit so that information can pass between the data-processing system and the tender by way of the material-processing stations.

11 Claims, 3 Drawing Sheets

FIG 3
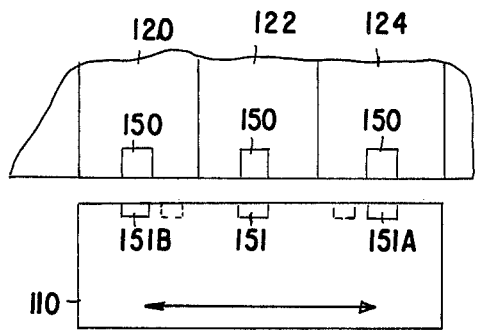
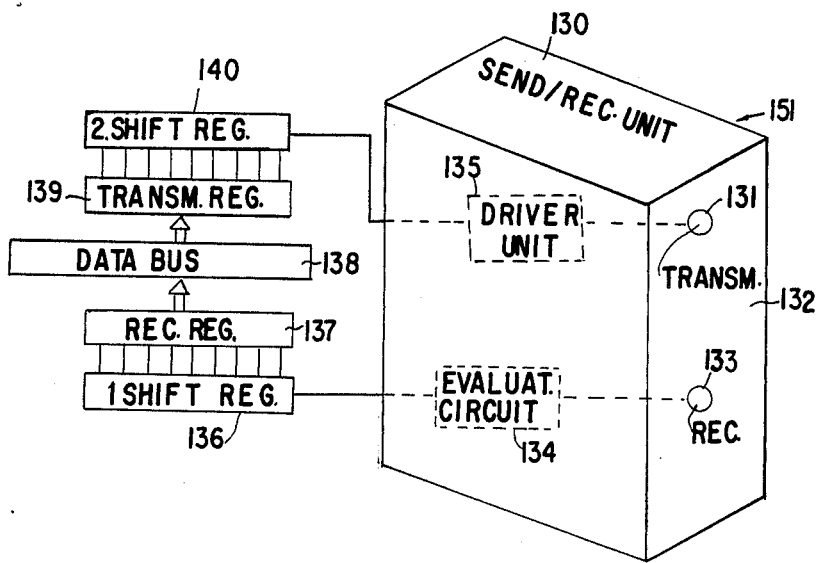
FIG. 4.

COMMUNICATIONS SYSTEM FOR AN INSTALLATION AND METHOD OF CONTROLLING SUCH INSTALLATION

BACKGROUND OF THE INVENTION

The present invention relates to a new and improved construction of a communications system and, in particular, to an installation containing such communications system for the control operation thereof. The invention further pertains to a control system for a travelling tender movable along a predeterminate path of travel and to a method of controlling an installation having a number of work stations and a tender.

In its more specific aspects, the present invention relates to the automation of an installation, such as a machine or a plant which has a number of material-processing stations and at least one servicing unit or tender and controllable drive units for producing relative movement between the tender and the material-processing stations. As a rule, the tender is a travelling tender and the material-processing stations remain in predetermined positions. However, the converse arrangement, move past a stationary servicing unit or tender, also falls under this invention.

The invention is of use more particularly for arrangements in which the material-processing stations are disposed close beside one another, for example, in at least one row. The embodiments set out as examples hereinafter relate solely to the automation of textile machinery such as, for example, spinning, winding, doubling, false twisting, texturing and similar machinery (and plants consisting thereof), but the invention is not limited to this particular area of use. The term "installation" is thus generally used broadly hereinafter to encompass machines and/or plants.

Large computers for data processing and process control have been in use in industry since as early as the end of the 1950's or the beginning of the 1960's (see for example, U.S. Pat. No. 3,045,210, granted July 17, 1962 and U.S. Pat. No. 3,582,621, granted June 1, 1971). Endeavors were simultaneously being made to control the movements of a travelling servicing unit or tender for a textile machine or a textile machinery plant from a central control station, (see for example, U.S. Pat. No. 3,070,320, granted Dec. 25, 1962, U.S. Pat. No. 3,067,962, granted Dec. 11, 1962 and U.S. Pat. No. 3,300,959, granted Jan. 31, 1967) but without using the elaborate contemporary computer technology.

Up to the end of the 1960's and/or the beginning of the 1970's, various suggestions were made to use data processing and process control technology in connection with machine tools and textile machinery, see, for example, U.S. Pat. No. 3,638,191, granted Jan. 25, 1972, U.S. Pat. No. 3,430,426, granted Mar. 4, 1969, U.S. Pat. No. 3,648,026, granted Mar. 7, 1972, and U.S. Pat. No. 3,648,027, granted Mar. 7, 1972, and U.S. Pat. No. 3,798,624, granted Mar. 19, 1974. The suggestions included the control of a servicing tender, see, for example, U.S. Pat. No. 3,824,558, granted July 16, 1974, U.S. Pat. No. 3,680,297, granted Aug. 1, 1972, U.S. Pat. No. 3,680,298, granted Aug. 1, 1972 and U.S. Pat. No. 3,680,299, granted Aug. 1, 1972, the latter suggestions having been modified by the subsequently published U.S. Pat. No. 4,425,754, granted Jan. 17, 1984. These suggestions went as far as centralized control of a complete spinning works (U.S. Pat. No. 3,922,642, granted Nov. 25, 1975).

However, despite these possibilities for centralized control, the usable travelling tenders were devised to react to relatively simple signal transmitters (indicating lamps) in the various stations, (see, for example, British Pat. No. 1,103,267, published Feb. 14, 1968 and U.S. Pat. No. 3,810,352, granted May 14, 1974. It was suggested that a computer should control the movements of a tender in the complete installation while working on the various machines which had to be controlled conventionally (German Published Patent Application No. 2,460,375, published June 24, 1976). At about the same time, (U.S. Pat. No. 3,950,926, granted Apr. 20, 1976 and U.S. Pat. No. 4,043,106, granted Aug. 23, 1977), it was suggested that information be transmitted without mechanical contact from discrete spinning stations to a travelling automatic tender.

Suggestions for providing the travelling tender itself with data-processing facilities can be found in patent literature from the start of the 1970's (see for example, U.S. Pat. No. 3,789,595, granted Feb. 5, 1974, U.S. Pat. No. 3,908,347, granted Sept. 30, 1975 U.S. Pat. No. 4,005,392, granted Jan. 25, 1977 and Japanese Pat. No. 50-20042, dated June 28, 1973. Towards the end of the 1970's, there were proposals for collecting data at the various stations for subsequent transmission to the tender (see for example, U.S. Pat. No. 4,136,511, granted Jan. 30, 1979, and U.S. Pat. No. 4,137,699, granted Feb. 6, 1979). In the early 1980's, microprocessors have been coming into use to organize data flow within the machines (see for example, U.S. Pat. No. 4,294,065, granted Oct. 13, 1981 and German Pat. No. 3,005,746, published Aug. 27, 1981).

Various suggestions have been made from time to time to use available data to optimize various procedures and two of the more recent variants on this theme can be found in European Published Patent Application No. 47,723, published Mar. 17, 1982, and European Published Patent Application No. 90,911, published Oct. 12, 1983.

Communications connections between the various elements of the system are of decisive importance for the success of the various suggestions. However, this aspect has been given relatively little attention in the patent literature. The transmission of information without mechanical contact has been mentioned in various places, see more particularly, U.S. Pat. No. 4,137,699, granted Feb. 6, 1979 (transmission from a spinning station to the travelling automatic tender) and German Published Patent Application No. 3,135,333, published Mar. 24, 1983, (transmission from a central control station to the automatic tender), but the transmission is usually by way of conductors, see German Published Patent Application No. 3,303,733, published Aug. 9, 1984, German Published Patent Application No. 3,332,899, published Mar. 28, 1985, German Published Patent Application No. 3,510,521, published Oct. 2, 1986, U.S. Pat. No. 4,340,187, granted July 20, 1982 and U.S. Pat. No. 4,475,331, granted Oct. 9, 1984 where a wired connection is regarded as more advantageous than a connection without mechanical contact.

A second aspect which has attracted even less attention is the integration of all the information-carrying elements in a total or complete system. However, the possibilities of integration determine the practical limits for optimizing the system.

SUMMARY OF THE INVENTION

Therefore, with the foregoing in mind, it is a primary object of the present invention to provide a new and improved communications system which is not afflicted with the aforementioned drawbacks and shortcomings of the prior art constructions.

Another and more specific object of the present invention is directed to a new and improved construction of a communications system wherein it is possible to make better use of the facilities at present available in order to link the stations and the tender together in an organized information system.

A further object of the present invention aims at the provision of an improved control system for a tender and a method of controlling an installation having a number of work stations and a tender, wherein the tender and the number of work stations are relatively movable with respect to one another, and wherein the tender and work stations can be reliably linked together in an organized information system.

To this end, the invention calls for an installation, namely a machine or plant having a number of material-processing stations each having an at least partly independently operating control circuit, such as a microprocessor. Arrangements of this kind are now prior art.

At least one servicing unit or tender for making predetermined interventions at individual stations, and drive units are provided for producing controllable relative movement between the tender and the stations.

The individual or discrete independent control circuits are interconnected by appropriate communication equipment for information or data transmission. This, too, is now prior art, the connection normally being made by way of a central control station, i.e. a control center or central computer. A control center of this kind can be provided directly in one machine or jointly for a number of machines.

The present invention also provides controllable data transmission units for the direct exchange (preferably without mechanical contact) of information (data) between the tender and each of the independently operating control circuits at the individual material-processing stations when the tender and the material-processing station are arranged in predetermined relationship to one another.

For example, a data-transmission zone can be defined for each of the control circuits so that there can be an exchange of data between the tender and the control circuits when the tender is located in the data transmission zone of individual material-processing stations zone.

Information exchange between the material-processing tender and the station proceeds preferably by optical communication, such as light barriers, not involving mechanical contact, the tender having a send-receive (transmitter-receiver) unit and each station having its own send-receive (transmitter-receiver) unit.

The arrangement can be such that whenever the tender enters the data transmission zone of a station, it reports its presence at such station and interrogates the station about its instantaneous condition. An information exchange therefore occurs even when the tender passes by the station without stopping.

The control circuits can be so organized as to supply data concerning its contact with the tender to the total information system which includes at least the control circuits of all other material-processing stations for data transmission between such control circuits and the data transmission units for information exchange between the tender and each at least partly independently operating control circuit.

The invention is not only concerned with the aforementioned aspects of the machine or installation but also relates to a novel control system generally serving for controlling a tender, for instance, a travelling tender movable along a predetermined path of travel. The inventive control system permits transmitting data to the travelling tender at predeterminate locations disposed along the predeterminate path of travel of the travelling tender. Data exchange units are provided at the travelling tender for enabling the exchange of data or information with each such predeterminate location. The travelling tender and a particular location of the predeterminate locations must be in a predeterminate relationship with one another for such data exchange to be possible. The predeterminate locations are integrated into a total information system including data transmission facilities between the tender and the predetermined locations as well as between the predetermined locations.

The invention is furthermore concerned with method aspects, particularly a novel method of controlling an installation having a number of work stations and a tender, and wherein the tender and the number of work stations are relatively movable with respect to one another. When carrying out the inventive method, there are performed the steps of interconnecting the work stations and the tender in order to form a total information system for the exchange of information and exchanging information directly between the tender and a discrete work station of the number of work stations and by way of the total information system between the work stations.

The novel principle according to this invention is illustrated diagrammatically in FIG. 1 as applied to a present day commercially available kind of rotor spinning machine. Such a machine comprises a data-processing system Patent Specification No. 156,153, published June 16, 1987, to which reference may be readily had and which document is incorporated herein by reference. Only the main aspects of the system will be summarized here.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 3 is a fragmentary showing of a modification; and

FIG. 4 illustrates details of a send-receive unit and associated circuit components.

DETAILED DESCRIPTION OF THE PREFERRED EMBODIMENTS

Figure 1:
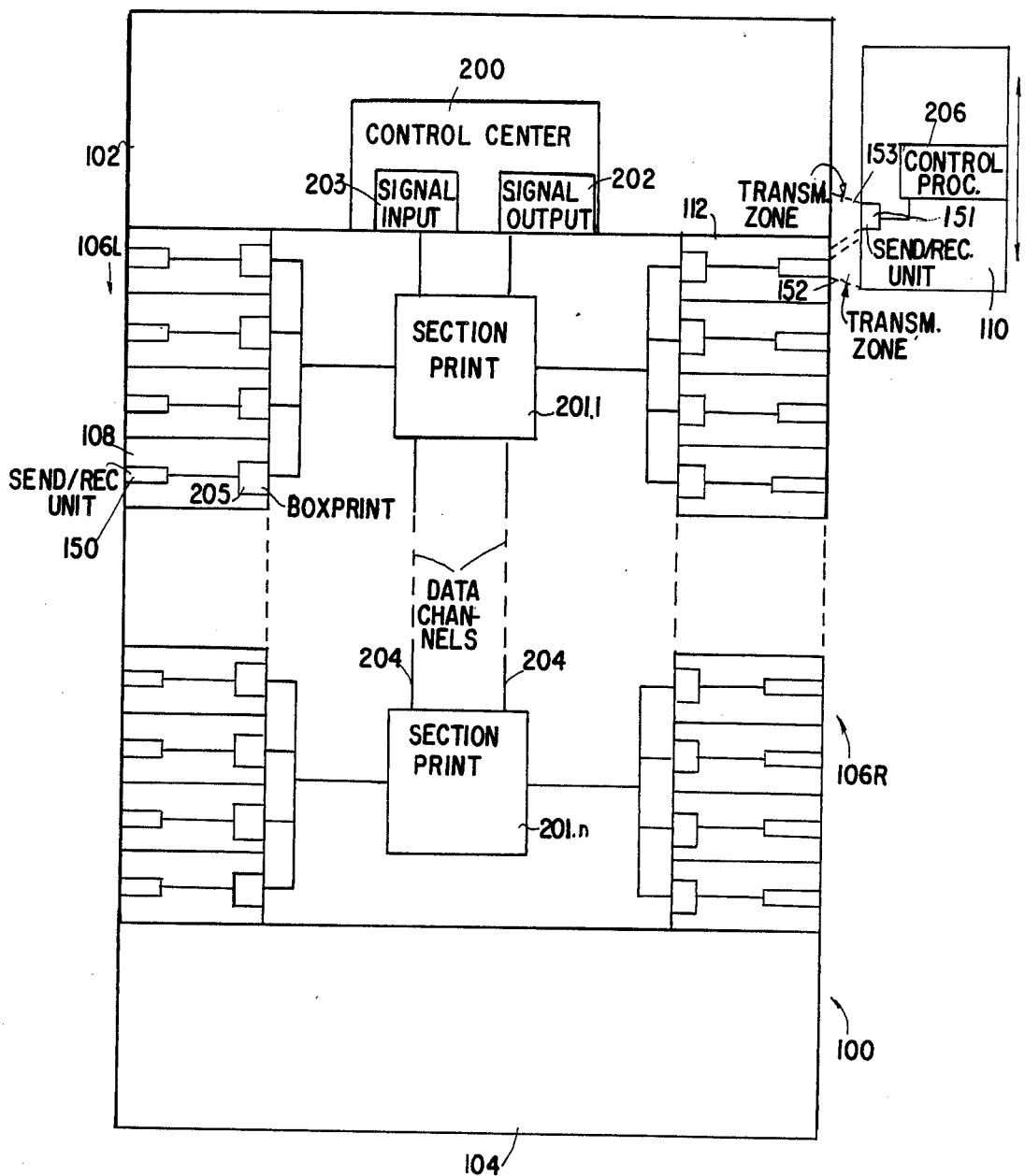
FIG. 1 schematically illustrates an installation equipped with a communication system according to the present invention.

Describing now the drawings, it is to be understood that to simplify the showing thereof, only enough of the structure of the communications system has been illustrated readily understand the underlying principles and concepts of the present invention. Turning now specifically to FIG. 1 of the drawings, the arrangement illustrated therein by way of example and not limitation, will be seen to comprise an installation, here a machine 100 comprising two end heads 102 and 104, a first row 106L of spinning stations on one long side of the machine 100 and a second row 106R of spinning stations on the other long side of the machine 100. The end heads 102 and 104 comprise driving motors, transmission, fan, control and indicating elements, and so forth, jointly serving all the spinning stations. Disposed in end head 102 is a control center or antral computer 200 which, in a manner to be described hereinafter, is indirectly connected to the discrete spinning stations and can control the same in accordance with a predetermined program.

For signal transmission between the control center 200 and the spinning stations, the latter are arranged in "sections" each associated with a "subexchange" (a so-called section print). In FIG. 1, a section print 201.1 nearest the end head 102 and a section print 201.n furthest from the end head 102 are shown, (n−2) section prints which are not shown being present between section print 201.1 and section print 201.n. Each section print 201.1 to 201.n serves a number of spinning stations, half of them in row 106L and the other half in row 106R. As a rule, a sections is from 10 to 12. For the sake of clarity, only 8 spinning stations per section are diagrammatically shown in FIG. 1.

The section prints 201.1 to 201.n are connected to a signal output 202 and signal input 203 in the control center 200 by data channels 204. Data (status reports, instructions, and so forth) are exchanged between the control center 200 and the section prints 201.1 to 201.n in accordance with an interrogation timing determined by the control center 200.

Each spinning station (in this connection, the station 108 in row 106L and the first section is taken purely as an example) comprises its own independently operating control circuit or means called a "boxprint" 205. The boxprint 205 is connected to all the important function elements (not shown) in its own spinning station for the exchange of signals and is therefore continuously informed about the states of the various elements and ready to engage in the procedure in its own spinning station. The boxprint 205 also comprises storage means so that data about the instantaneous states of the function elements are available. Nowadays, the boxprint 205 is normally in the form of a microprocessor.

Each section print 201.1 to 201.n is connected to the boxprints 205 of its spinning stations for signal exchange. The section prints 201.1 to 201.n are operative as exchanges between the boxprints 205 and the control center 200, obtaining data from their boxprints 205 at a predetermined timing, transmitting such data to the control center 200, receiving data therefrom and transmitting such data to the corresponding boxprints 205. However, the section prints 201.1 to 201.n can themselves give instructions to their boxprints 205. For example, some evaluation functions can be provided in the section prints 201.1 to 201.n, in which event, the section print 201.1 to 201.n can, in accordance with an evaluation program, give an instruction to a box print 205 and make a corresponding report-back to the control center 200. However, the boxprints 205 operate independently (each on its own in accordance with its own programming) until receiving an instruction from a station higher up the hierarchy.

A modern machine 100 also has a, for instance, travelling serving unit or tender 110. The tender 110 moves on an appropriate guide (not shown) along at least one long side of the machine 100. If the same has only one tender 110, the same must be able to travel around at least one end head 102 or 104 and along the other machine side. Tenders of this kind are prior art in the textile machinery industry and so are not described in greater detail herein. Examples have been described in European Published Patent Application Nos. 126,352, published Nov. 28, 1984, 126,373, published Nov. 28, 1984, 127,107, published July 29, 1987 and 190,421, published Aug. 13, 1986. The main point in connection with this invention is that each tender 110 has its own independently operating control processor (its own microprocessor) 206 which controls the procedures in the tender 110 in accordance with a predetermined programming.

To this extent, the machine 100 hereinbefore described, does not differ from conventional machines.

Unlike conventional machines, however, the machine 100 shown FIG. 1 has additional data transmission facilities. To this end, each spinning station has its own send-receive (transmitter-receiver) unit 150 (shown only for the spinning station 108) and the tender 110 has a corresponding send-receive (transmitter-receiver) unit 151. Each spinning station send-receive unit 150 is directly connected to its boxprint 205 for two-way signal transmission and the tender send-receive unit 151 is correspondingly connected to the tender control processor 206.

Each spinning station send-receive unit 150 is adapted for a two-way exchange of signals with the tender send-receive unit 151 without mechanical contact. However, each send-receive unit 150 and 151 defines its "working range", i.e. transmission zone or signal acceptance angle 152 and 153, the various signal acceptance angles having their lengths extending perpendicularly to the machine length. The signal acceptance angle 153 of the send-receive unit 151 is indicated by chain lines in FIG. 1 and the signal acceptance angle 152 of the adjacent spinning station 112 is indicated by chain lines. An information exchange (exchange of data or signals) between the tender 110 and a particular spinning station can proceed only when the tender signal acceptance angle 153 and the spinning station signal acceptance angle 152 overlap. The send-receive units 150 are so disposed in the spinning stations and the send-receive unit 151 is so disposed in the tender 110 that the tender signal acceptance angle 153 overlaps with the signal acceptance angle 152 of a spinning station when the tender 110 passes by the particular spinning station concerned.

Further details of a practical system will be described hereinafter a mention of some of the effects of the principle explained with reference to FIG. 1:

(1) The system can be so designed that a spinning station transmits signals by way of its send-receive unit 150 only when instructed to do so by the tender 110 (passive spinning stations, active tender).

(2) Data from the tender control processor 206 can, after transmission to any spinning station, be further transmitted by way of that station's boxprint 205 and the associated section print 201.1 to 201.n to the control center 200.

(3) Conversely, instructions from the control center 200 can be transmitted by way of any spinning stations to the tender control processor 206.

(4) The system can be so designed that when the tender 110 passes by each spinning station, it can report back at such spinning station (even when not instructed to make any intervention at such station) and the boxprints 205 can transmit these report-backs to the control center 200 via the section prints 201.1 to 201.n. The control center 200 can then at least monitor and possibly optimize the movements of the tender 110.

(5) The boxprints 205 can be so designed as to carry-out predetermined instructions issuable by the tender 110 without requesting confirmation from the section print 201.1 to 201.n or from the control center 200.

As this short list of effects shows, a relatively simple modification of existing machine constructions (fitting the send-receive units 151 and 150 and connecting them to their associated control processors 206 and boxprints 205, respectively) makes possible an appreciably greater integration of the tender 110 in the total information system.

Figure 2:
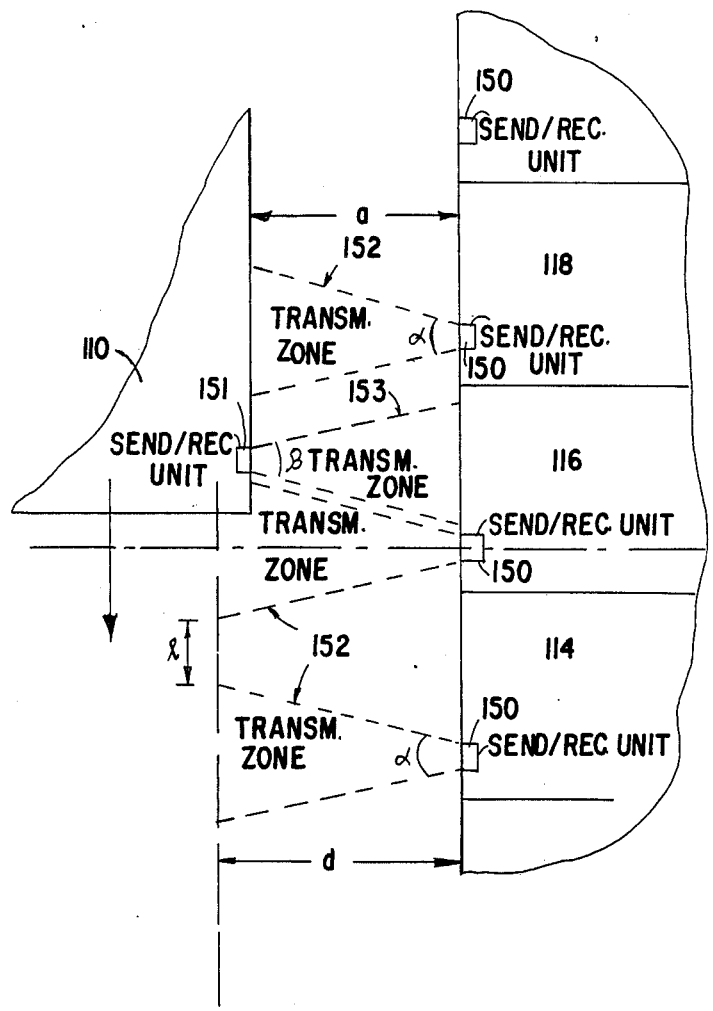
FIG. 2 illustrates a detail of the installation shown in FIG. 1.

Consideration will now be given, with reference to FIG. 2, to some requirements for practical embodiments using available technology. FIG. 2 shows three side-by-side spinning stations 114, 116 and 118 together with the front part, i.e. the part which leads in the direction of travel of the tender 110, the same moving past the spinning stations in the direction of travel indicated by an arrow.

As already described with reference to FIG. 1, each spinning station has a send-receive unit 150 which has a corresponding signal acceptance angle 152. However, these send-receive units 150 are "passive", i.e. they do not transmit on their own initiative but transmit only when instructed to do so by an interrogation or query signal from the tender send-receive unit 151.

Each signal acceptance angle 152 has an effective maximum extent in the transverse direction, i.e. perpendicularly to the long side of the machine 100 and to the direction of tender travel. This effective maximum extent is dependent upon the sensitivity of the receivers, the strength of the transmitters and the radiation angle $\alpha$ and is designated by the reference character d for the signal acceptance angle 152 of the station 114. The extent d must be greater than the maximum distance a between the send-receive unit 151 and a send-receive unit 150 when such send-receive units are directly facing one another, i.e. when the send-receive unit 151 intersects the axis of a signal acceptance angle 152. The distance a must be maintained within predetermined tolerances by the guide for the tender 110 and the dimension d should of course be the same for all the send-receive units 150 so far as is possible in practice. The term "signal acceptance angle" as used hereinafter refers to the effective signal acceptance angle of axial length d. A signal transmitted by a spinning station transmitter is propagated beyond the effective signal acceptance angle 152 but is insignificant outside the same since it is too weak to be detected by the send-receive unit 151 of the tender.

Each signal acceptance angle 152 should, as far as practically possible, have the same value $\alpha$ so that adjacent signal acceptance angles 152 are spaced apart from one another by a minimum distance 1 as considered in the direction of tender travel. The tender control processor 206 can therefore clearly differentiate adjacent spinning stations from one another provided that the value $\beta$ of the signal acceptance angle 153 of the tender send-receive unit 151 does not permit simultaneous overlapping with an adjacent signal acceptance angle 152.

Information exchange between the tender 110 and a spinning station can proceed when an overlap occurs between the tender signal acceptance angle 153 and the signal acceptance angle 152 can continue for as long as such overlapping exists. Consequently, the maximum transmission time for a single "contact" between the tender 110 and the spinning station depends upon the speed of travel of the tender 110 and the maximum value of the signal acceptance angles 152. A top limit to the signal acceptance angles 152 is set by the "pitch" of the spinning stations, i.e. by the distance between two adjacent send-receive units 150. This pitch depends upon the general construction of the machine 100 and cannot normally be altered to suit the information system. As a rule, the speed of travel of the tender 110 is as fast as possible in practice for the sake of a high efficiency. Very stringent requirements are therefore made on the information-transmitting facilities and it is advisable to limit the quantity of data to be transmitted at the first contact (during the starting phase).

In any case, at least the following signals should be exchanged between the tender 110 and a spinning station at first contact:

(1) An interrogation signal from the tender 100;

(2) A reaction by the spinning station in the form of a status signal; and (3) A reply by the tender 110.

All the important basic data can therefore be exchanged, but this variant does not make optimum use of the possibilities of the system. It is useful even in the first contact (while the tender 110 is still travelling at full speed) to be able to transmit a "message", such as an instruction issued by the control center 200, to the tender control processor 206. An exchange of five signals is therefore provided for the first contact, viz. the three signals just mentioned and the following additional signals:

(4) A message from the spinning station to the tender 110; and (5) A "signing-off" of the tender 100 from the spinning station.

Two different behaviors can therefore be fundamentally defined, viz. a behavior for the case in which the tender 110 should move on and a behavior for the case in which the spinning station requires intervention (servicing). The corresponding signal procedures can be represented on a keyword basis as follows:

| Signal | Procedure 1 (move on) | | Procedure 2 (stop) | |
| --- | --- | --- | --- | --- |
| | Tender | Spinning Station | Tender | Spinning Station |
| 1. | Interrogation | → | Interrogation | → |
| 2. | ← | Status | ← | "SOS" status |
| 3. | Acknowledgement | → | Reply | → |
| 4 | ← | Message | ← | Acknowlegement |
| 5. | Signing-off | → | Signing-off | → | the arrow for each signal indicating the direction of transmission.

Status signal No. 2 of the first procedure can is spinning normally, an "OK" signal can be transmitted. If the spinning station is blocked because intervention by a tender is unlikely to be successful, a fault signal can be transmitted. Such a blocking can be produced, for example, by the control center 200 or by the section printer 201.1 to 201.n in connection with a quality evaluation.

The "SOS" status signal No. 2 in the second procedure indicates that the spinning station requires an intervention by the tender. The signal can take various forms in dependence upon the required intervention. The corresponding "reply" can be in the form of an instruction which goes directly to the station control circuit or boxprint 205 and triggers preparatory work in the spinning station for the required intervention. The tender itself is then retarded, positions itself opposite the particular spinning station concerned and carries out the intervention.

During the intervention, further signals can be exchanged between the spinning station and the tender 110 so that on the direct instruction of the tender 110, the spinning station can carry out "supplementary work" during the intervention and/or transmit "messages" from the tender 110 to the control center 200. The tender 110 can therefore inform the control center 200 about the states it has "encountered" at the spinning station and/or of particulars about the work it has carried out. However, the tender send-receive unit 151 cannot transmit information while the tender 110 is stationary since after transmission of signal No. 5 of the first contact phase, the tender signal acceptance angle 153 no longer overlaps with the signal acceptance angle 152 of the particular spinning station concerned. The tender 110 must therefore have at least one additional send-receive unit (not shown in FIGS. 1 and 2) and such second unit should be disposed immediately opposite the send-receive unit 150 of a spinning station when the tender 110 has taken-up its position thereat to make interventions.

However, as will be described in greater detail hereinafter, the tender 110 may, in some circumstances, refuse a call for assistance from a spinning station, for example, if the tender 110 has previously received an instruction from the control center 200 to carry-out work having a higher priority. In this event, the reply signal (No. 3) in the second procedure does not trigger any work in the spinning station but is nevertheless acknowledged thereby.

In any case, (procedure 1 or procedure 2), the contact between the tender 110 and the spinning station is recorded in the storage means of the boxprint 205 (FIG. 1) of the particular station concerned and reported back to the control center 200 by way of the section print 201.1 to 201.n during the interrogation cycle determined by the control center 200. The control center 200, therefore, continuously receives report-backs concerning the movements and any servicing activities of the tender 110.

In the description of the embodiments shown in FIGS. 1 and 2, emphasis was placed on information transmission between the tender 110 and spinning stations without mechanical contact. Such transmission helps to obviate the mechanical problems associated with transmission by way of a trailing cable or of a rubbing contact with a track. The problems of the correct spinning station responding can therefore be solved fairly easily. During it normal patrolling (travel at full speed), the tender 110 transmits interrogation signals at a predetermined timing so that the interrogation signal is transmitted after an overlap has been produced between the tender signal acceptance angle 153 and the signal acceptance angle 152 of a spinning station. Such spinning station is then automatically claimed by the interrogation signal it has received and is activated for information transmission.

However, the invention does not exclude direct connections between the tender 110 and the spinning stations. Means for producing such connections are known from U.S. Pat. No. 4,475,331, granted Oct. 9, 1984, wherein the spinning stations can be individually connected seriatim to a bus bar by mechanical actuation of switches while the tender 110 is travelling. This system could be adapted to the use according to this invention, in which event the bus bar would have to be adapted to transmit data to memories in the spinning stations. Also, it would be advisable to connect a spinning station memory to the bus bar not by mechanical actuation of a switch but by actuation of a switch without mechanical contact.

However, a transmission of data between the tender and the spinning station without mechanical contact is preferred and can be achieved by optical send-receive units. Devices of this kind are known which can operate at transmission speeds of up to 9,600 bauds. This rate is described assuming that the tender travels at a speed of approximately 30 meters per minute, that the distance a (FIG. 2) is up to 200 mm and that the "pitch" of the spinning stations is about 215 mm. This gives a transmission duration between 10 and 40 milliseconds for a maximum tender travel of 25 to 30 mm during the transmission.

To indicate some of the possibilities opened up by this invention, different kinds of signal for exchange between the tender 110 and the spinning station will be mentioned hereinafter and briefly described. These signals are preferably formed by the serial transmission of pulses (bits) so that the proposed connection without mechanical contact between the tender 110 and a spinning station operates as a serial interface.

Some signals are exchanged only between the tender 110 and the spinning stations—i.e., the spinning stations do not transmit them to other machine elements. In addition to the acknowledgement signals, this group of signals mainly comprises the instructions going directly from the tender 110 to a spinning station. The possibilities in this connection depend upon the general construction of the machine 100, more particularly, upon the mechanical functions controllable by a boxprint 205. Such functions are, for example, the feeding of fiber material to the spinning elements, cleaning thereof, movement of stop motions, movement of bobbin holders or the like.

A second group comprises signals representing conditions at the spinning station. These signals are therefore produced by the boxprint 205 of a spinning station and are reported back to the control center 200 by way of the relevant section print 201.1 to 201.n. The most important indication given by these signals is a yarn breakage whether occurring at random or in a controlled fashion, for example, by being produced by a yarn quality monitoring system.

A further group comprises the signals originating from the central computer 200. This group comprises, for example, a doff signal (where bobbin lengths are monitored by a central length measurement) and a preventive servicing signal in cases in which the continuous operation of a spinning station is monitored by the central computer 200 so that the same can order a particular intervention, such as cleaning, after a predetermined period. In the latter case, the system, can be so designed that the central computer 200 defines a particular interval (duration of operation) within which the preventive servicing intervention must be carried out. The central computer 200 transmits the servicing instruction to the particular boxprint 205 concerned at the start of such interval and it is subsequently transmitted to the tender 110 at the earliest opportunity. During the interval, the spinning station continues to operate normally unless there is an accidental yarn breakage.

However, preventive servicing has a relatively low assistance if it has already been given an instruction to carry-out higher priority work. If the preventive servicing has not been carried-out by the end of the set interval, the central computer 200 can instruct the boxprint 205 to cause a yarn breakage, in which event, action at the spinning station concerned receives a higher priority.

A quality cut signal can be considered as another signal of this kind; in this case, the central computer 200 (or section print 201.1 to 201.n) initiates a yarn breakage because the quality monitoring facility has detected the production. Of lower quality yarn by the spinning station concerned. The tender 110 can therefore be instructed to unwind a predetermined length of yarn off the bobbin and remove such length before the spinning station restarts. A procedure of this kind has been suggested, for example, in U.S. Pat. No. 4,137,699, granted Feb. 6, 1979.

An instruction from the central computer 200 to the tender 110 can be regarded as an important signal of this kind. particular spinning station or at any spinning station either for an exchange of information between the tender 110 and the central computer 200 (about the corresponding boxprint 205 and section print 201.1 to 201.n) or just because the central computer 200 has discovered that the tender 110 is not required to make an intervention for the time being. When further work is to be carried out, the tender 110 can be restarted by the central computer in the correct direction.

A final group comprises signals which originate from the tender 110 and are to be transmitted to the central computer 200. This group comprises, for example, status reports concerning the spinning station, such as, "no pattern material found"; or "no yarn found" or about status alterations carried-out by the tender 110 in accordance with its programming, for instance, when the tender 110 classifies the spinning station to be serviced as faulty.

To show more clearly the advantageous effects of the novel system, some signals will be dealt with individually as examples hereinafter.

Reset signals: Whenever the tender 110 inserts a new tube in a particular spinning station, it can transmit a reset signal via such spinning station to the central computer so that bobbin length measurement for such spinning station in zeroed.

Results of interventions: The spinning station and/or the tender 110 can inform the central computer about the success or failure of particular interventions, for example, "pieced-up for the x$^{th}$ time" or "cut because of unsatisfactory piecer", etc. The central computer can therefore monitor not only the spinning stations but also the efficiency of the tender 110. If the same failures occur regularly at different spinning stations, there may be a fault in the tender 110.

Quality cut: When the quality control system interrupts the spinning at a particular spinning station, the same can be instructed to inform the tender 110 of the kind of yarn defect (by a corresponding form of signal). The tender 110 can react by unwinding and removing from the bobbin, a length of yarn which depends upon the kind of fault. The length measurement for the bobbin can be corrected correspondingly.

Preventive servicing: As already described, the spinning station can normally continue to operate until the tender 110 indicates to such spinning station that the tender 110 is ready to carry-out servicing. The spinning station can then cause a yarn breakage automatically and the so-called "fiber tuft preparation" (see U.S. Pat. No. 4,022,011, granted May 10, 1977) can then be omitted since the sliver is ready for immediate piecing.

Identification of spinning stations: The central computer can instruct a boxprint to reply to a query transmitted by the tender 110 with an identification signal (ID signal or tracing signal) instead of an ordinary status signal. The central computer can therefore send the tender 110 to such spinning station just by indicating the appropriate direction to the tender 110 and instructing it to search for the tracing signal. The same can be different for each spinning station, for instance, each spinning station can be allotted its own identification number which it transmits as tracing signal.

The latter kind of signal clearly shows another advantage of the novel system. The tender 110 can be guided to a particular place on its track without itself needing to have a "layout plan" of the track. The station itself can be placed in a state such that the tender 110 recognizes it as the "correct station". Also, the tender 110 can inform the central computer about the conditions found in a particular spinning station without itself needing to identify such spinning station. Since the particulars concerned are transmitted by way of the spinning station, the central computer will readily detect the station which is intended.

The spinning station having a defect such that no information can be transmitted by it, is, of course, an exceptional case. However, the tender 110 can be so programmed in such a case to take-up a position at the neighboring spinning station and transmit information about the faulty station to the central computer by way of the neighboring spinning station.

Integrating the tracing signal in the information transmission system is advantageous but not essential for the invention. For example a different ("orientation") system could be provided which is operative to "mark" particular spinning stations, for example, by the illumination of conventional indicating lamps which the tender 110 can recognize. However, intergration with information transmission is much more efficient.

It may, in such cases, be advantageous so to condition the tender 110 by a corresponding instruction from the central computer that in a first state, the tender 110 patrols while in a second state, the tender 110 hunts for a spinning station determined by the control center 200. The tender 110 can then transmit corresponding query or interrogation signals by asking about the operating state of the spinning stations as it patrols, while in the hunt or search mode, it asks for identification of the spinning station.

Monitoring by the Tender

The tender 110 can be devised to perform some monitoring functions independently of the information transmitted to it. To this end, it can have appropriate sensors which react directly to the operating states of selected spinning station elements (for example, bobbin diameter or the state of bobbin holders—see European Pat. No. 126,373, published Nov. 28, 1984) as it passes by, irrespective of whether or not it is requested to do so by the spinning station. If this monitoring detects a "fault" (a forbidden combination of operating states), the tender 110 can position itself at the station concerned (even though the spinning station instructs it to move on) and inform the central computer of the states it finds by way of the spinning station itself. The tender 110 itself therefore operates at least to some extent as a travelling monitor of the elements in the machine.

Operatives

Although intervention can be automated to a considerable extent, some operations, such as changing with the introduction of a new sliver end, still have to be carried out at present by operatives. It can then be arranged that, when operations are carried-out by operatives, the signal state of the spinning station must be altered deliberately or automatically. At the next passage of the tender 110 past the spinning station, the new signal state thereof should indicate to the tender 110 that the spinning station is ready to resume operation. The status change can also be reported back to the central computer so that the tender 110 can, if necessary, be sent directly to such spinning station.

Preferred embodiments will be briefly described with reference to FIGS. 3 and 4. FIG. 3 diagrammatically illustrates three other spinning stations 120, 122 and 124 each having a send-receive (transmitter-receiver) unit 150. The tender 110 has taken-up a position opposite the central spinning station 122 to carry-out interventions. The tender 110 has three send-receive (transmitter-receiver) units, the central send-receive unit 151 being directly opposite the send-receive unit 150 of the spinning station 122 to be serviced. While the tender 110 remains stationary, information can be exchanged continuously between the send-receive unit 151 and the send-receive unit 150 of the spinning station 122.

Two send-receive units 151A and 151B are operative for interrogation and to build-up the first contact, the send-receive unit 151A being operative for travel of the tender 110 to the right in FIG. 3 while the send-receive unit 151B is operative for travel of the tender 110 to the left. The spacing (not shown) between the two "outer units" 151B and 151A corresponds to approximately twice the between-stations "pitch". In the variant shown in solid lines, the send-receive unit 151A is directly opposite the send-receive unit 150 of station 124 and the send-receive unit 151B is directly opposite the send-receive unit 150 of the spinning station 120 when the tender 110 is in position at the central spinning station 122. Consequently, each of the two spinning stations 120 and 124 can be interrogated before the tender 110 moves away from the spinning station 122 after completion of its work there. However, the send-receive units 151B and 151A can readily be moved inwards, as indicated by chain lines, so that the tender 110 must move-off in a predetermined direction before it can receive any further reply to a query or interrogation signal.

FIG. 4 shows further details of a (any) send-receive unit 151 of the tender 110 together with associated circuit elements. The send-receive unit 151 comprises a casing 130 (shown in perspective) which is so fitted in the tender 110 as to have one surface 132 directed towards the spinning station. A light beam transmitter (light-emitting diode) 131 and a light-sensitive element (a photodiode) 133 are so disposed in the surface 132 as to be directed towards corresponding elements in the spinning station send-receive units 150. The tender send-receive unit 151 also comprises an electronic evaluating circuit 134 associated with the light-sensitive element 133 and an electronic driver unit 135 associated with the light beam transmitter or light-emitting diode 131. The output of the evaluating circuit 134 is connected to a first shift register 136 so that serially transmitted bits can be entered thereinto. When the first shift register 136 is full, the bits stored therein are transmitted in parallel to a receiver register 137 whereafter the shift register 136 is ready to receive further data. The bits stored in the receiver register 137 can be fetched by the control processor 206 (FIG. 1) at its own operating timing by way of a data bus 138 and evaluated.

An answer formulated by the control processor 206 can be delivered via the data bus 138 to a transmitter register 139 and therefrom to a second shift register SR2. The data bits can be transmitted therefrom serially to the driver unit 135 to control the light beam transmitter or light-emitting diode 131.

The spinning station send-receive units 150 can be devised correspondingly and cooperate with similarly devised circuitry. However, since the tender 110 has only three send-receive units 151, 151A and 151B but the machine 100 has more than 200 send-receive units 150, the send-receive units 150 should be of relatively simple construction and the send-receive units 151, 151A and 151B of relatively elaborate construction. The transmitter and receiver elements of the send-receive units 151, 151A and 151B can have, for example, lens systems, whereas the send-receive units 150 of the spinning stations operate without lenses. Correspondingly, the tender signal acceptance angle 153 will be much narrower than the spinning station signal acceptance angle 152 and can substantially correspond to a cylinder over the distance a (FIG. 2).

Other Variants and Uses

The invention does not preclude a direct connection between the central computer and the tender 110. When it is required to transmit data between the tender 110 and the spinning stations by way of a conductor, the central computer can readily be coupled to the same conductor. Even when it is required to transmit data between the tender 110 and the provided by way of a conductor, such as a trailing cable or . a track, and this, of course, leads to further facilities for data transmission between the central computer and the tender 110.

The embodiment shown, as an example, comprises a central computer or control center 200. However, this is not of importance for the invention. The information items and the "system intelligence" can be distributed among a number of centers (nodes). What is important is that the discrete spinning stations be integrated in an organized total information system so that the information exchanged between the tender 110 and a spinning station can be injected into the total system by the spinning station.

Information transmission from the tender 110 by way of the spinning stations must be intermittent since "blind zones" remain between adjacent spinning stations to ensure that they are clearly differentiated. Since the spinning stations themselves are disposed in close side-by-side relationship, the blind zones can be very short. However, when the tender 110 is required to travel outside a zone having spinning stations, for example, to travel around a machine head, from one long side to the other, the corresponding blind zone is relatively long. This disadvantage can be obviated by a direct link between the tender 110 and the sender. Also, data-transmission stations (without corresponding spinning stations) can be distributed over a relatively long zone. In any case, the departure of the tender 110 from the final spinning station at one end of the blind zone and the arrival of the tender 110 at the first spinning station at the other end of the blind zone can be monitored by the central computer.

A parking place for the tender 110 outside the operative zone—i.e., the zone having spinning stations—can be defined and can also have a send-receive unit for data transmission to the total system.

The invention is not limited to the total system being defined in a single machine. The operating stations of a number of machines can be connected by way of appropriate data transmitting facilities, for instance, to a higher central computer. In this event, one or more tenders can be controlled by the central computer for intervening at, or servicing all, the operating stations integrated in the system.

Even when the total system is provided in a single machine, a number of tenders can be controlled; the tenders need not all be of the same kind and tenders of different kinds can be used. For example, it is known for various operations such as piecing-up, bobbin changing, cleaning of spinning stations, etc. to be carried-out by various tenders. Where possible, all the tenders should receive their information by way of a single set of send-receive units in the spinning stations; theoretically, however, a separate set of such units can be provided for each kind of tender 110.

The invention is not limited to the use of optical facilities as send-receive units for the transmission of data without mechanical contact. For example, magnetic elements or ultrasonics can be used. As a rule, the spacing (for example, the distance a in FIG. 2), should be very short to ensuré that transmission is, as far as possible, free from disturbances.

Finally, the invention is not limited to use in textile machinery. The various operating stations can be of use for processing other materials. However, the invention is particularly useful where the operating stations are disposed in close side-by-side relationship at least in groups.

While there are shown and described present preferred embodiments of the invention, it is to be distinctly understood that the invention is not limited thereto, but may be otherwise variously embodied and practiced within the scope of the following claims. Accordingly,

What we claim is:

1. An installation comprising:
    a number of material-processing stations each having an at least partly independently operating control means;
    means for transmitting information between said at least partly independently operating control means of said number of material-processing stations;
    at least one tender for making predeterminate interventions at individual ones of said material-processing stations;
    said at least one tender and said number of material-processing stations being relatively movable with respect to one another; and
    means for exchanging information between said at least one tender and the at least partly independently operating control means at said individual ones of said material-processing stations when said at least one tender and said individual ones of said material-processing stations are in a predetermined relationship to one another, in order to thereby make said predeterminate interventions by said at least one tender at said individual ones of said material-processing stations.

2. The installation as defined in claim 1, wherein:
    said tender comprises a travelling unit.

3. The installation as defined in claim 1, wherein:
    each at least partly independently operating control means comprise means establishing a defined data transmission zone so that there can be accomplished an exchange of information between the at least one tender and the at least partly independently operating control means when the tender is in the data transmission zone of said at least partly independently operating control means.

4. The installation as defined in claim 1, wherein:
    said information exchange between said at least one tender and said at least partly independently operating control means at individual ones of the number of material-processing stations proceeds without mechanical contact.

5. The installation as defined in claim 4, wherein:
    said means for exchanging information comprise optical send-receive units.

6. The installation as defined in claim 1, wherein:
    said means for exchanging information between said at least one tender and the at least partly independently operating control means at said individual ones of said material-processing stations when said at least one tender and said individual ones of said material-processing stations are in said predetermined relationship to one another, enables the at least one tender, after having entered into said predetermined relationship to said individual ones of said material-processing stations, to report the presence of said at least one tender at said individual ones of said material-processing stations and to interrogate said individual ones of said material-processing stations about their instantaneous condition.

7. The installation as defined in claim 1, further including:
    means defining a total information system containing as intercommunicating constituents a control center means for transmitting information between said control center and said at least partly independently öperating control means, said at least partly independently operating control means of the number of material-processing stations and said means for exchanging information between said at least one tender and the at least partly independently operating control mean.

8. The installation as defined in claim 1, further including:
means defining a total information system containing as intercommunicating constituents, said means for transmitting information between said at least partly independently operating control means and said means for exchanging information between said at least one tender and the at least partly independently operating control means.

9. A control system for a travelling tender movable along a predeterminate path of travel, comprising:
a travelling tender movable along the predeterminate path of travel;
means for transmitting data to the travelling tender provided at predeterminate locations disposed along the predeterminate path of travel of the travelling tender;
data exchange means provided at said travelling tender for enabling exchange of data with individual ones of said predeterminate locations;
means for transmitting data between said predeterminate locations;
said travelling tender and the individual ones of said predeterminate locations being arranged in a predeterminate relationship with one another for enabling said exchange of data;
means defining a total information system; and
said total information system containing, as intercommunicating constituents, said means for transmitting data to the travelling tender provided at said predeterminate locations, said data exchange means provided at said travelling tender, and said means for transmitting data between said predeterminate locations.

10. The control system as defined in claim 9, wherein:
said predeterminate relationship is defined by a transmission zone enabling data exchange.

11. A method of controlling an installation having a number of work stations and a tender, wherein the tender and the number of work stations are relatively movable with respect to one another, comprising the steps of:
interconnecting for mutual information exchange, at least partly independently operating control means located at the individual work stations and means for exchanging information between the tender and the at least partly independently operating control means and thereby forming a total information system; and
exchanging information directly between the tender and individual ones of the work stations and between the work stations by way of the total information system.

* * * * *